United States Patent [19]
Faber et al.

[11] Patent Number: 5,458,834
[45] Date of Patent: Oct. 17, 1995

[54] EXTRUSION OF LOW VISCOSITY BATCH

[75] Inventors: Margaret K. Faber, Corning; Thomas D. Ketcham, Big Flats; Dell J. St. Julien, Watkins Glen, all of N.Y.

[73] Assignee: Corning Incorporated, Corning, N.Y.

[21] Appl. No.: 132,923

[22] Filed: Oct. 7, 1993

[51] Int. Cl.⁶ ................................................. B29C 47/08
[52] U.S. Cl. ............... 264/109; 264/177.12; 264/211.11; 264/232; 264/344
[58] Field of Search .................... 264/203, 210.3, 264/211.11, 109, 177.12, 232, 344

[56] References Cited

U.S. PATENT DOCUMENTS

| | | |
|---|---|---|
| 4,302,166 | 11/1981 | Fulwyler et al. . |
| 4,399,052 | 8/1983 | Sugino ............................ 264/29.7 |
| 4,725,391 | 2/1988 | Bardhan et al. . |
| 4,965,039 | 10/1990 | Schuetz . |
| 4,970,036 | 11/1990 | Thaler et al. ...................... 264/211.11 |
| 5,043,117 | 8/1991 | Adachi et al. . |
| 5,064,596 | 11/1991 | Chida et al. . |
| 5,089,455 | 2/1992 | Ketcham et al. . |
| 5,150,507 | 9/1992 | Goela et al. . |
| 5,162,098 | 11/1992 | Claar et al. . |
| 5,246,647 | 9/1993 | Beck et al. ............................ 264/210.3 |
| 5,248,464 | 9/1993 | Alford et al. ...................... 264/211.11 |
| 5,269,990 | 12/1993 | Khare et al. ...................... 264/211.11 |
| 5,314,520 | 5/1994 | Yagi et al. .......................... 264/211.11 |

FOREIGN PATENT DOCUMENTS

| | | |
|---|---|---|
| 0400778 | 12/1990 | European Pat. Off. . |
| 0483469A1 | 5/1992 | European Pat. Off. . |
| 2147202 | 9/1990 | Japan ................................. 264/211.11 |

Primary Examiner—Allan R. Kuhns
Attorney, Agent, or Firm—Angela N. Nwaneri

[57] ABSTRACT

A method of forming complex shapes from soft solvent-containing batches and maintaining the integrity of such formed bodies. The formed bodies are made self-supporting immediately after forming or soon thereafter by contacting the shaped body with a drying or hardening liquid in which the solvent is soluble. A method is also disclosed for simultaneously drying a formed body and creating or increasing the porosity of the body by adding solid particles which are soluble in the drying liquid.

6 Claims, 6 Drawing Sheets

EXTRUSION OF LOW VISCOSITY BATCH

BACKGROUND OF THE INVENTION

The present invention relates to a method of drying a formed cellular body to improve the surface integrity and handling of such body during subsequent processing steps.

It is becoming increasingly common to form highly loaded plastically deformable mixtures into complex structures such as a honeycomb configuration by extrusion. Immediately upon forming, the resulting structure is generally soft and fragile, and easily damaged or distorted, making the handling and processing of such structures very difficult. To overcome this problem, commercial extrusions of green bodies such as tubes, rods, and cellular structures are accomplished by using extremely stiff batches. The stiff batch is necessary for the extruded material to reflect the geometry of the extrusion die and for the extruded batch to maintain its shape during further processing. If the batch is too soft then the extruded body will sag or distort. However, stiff batch will not flow without significantly large applied pressure, typically in excess of 900 psi (6,000 KPa), depending on the desired extrudate geometry. The use of high pressures requires specially designed extrusion hardware which can withstand the high pressure and maintain close tolerances in the final ware. Standard extrusion dies require batches which must be entirely self supporting throughout the drying process.

Extrusion dies are often made from hardened steels or steels with wear resistant coatings. Without such coatings, a stiff viscous batch tends to wear away die material, and leads to a variation in the extruded product over time. These dies are difficult and expensive to manufacture and must be replaced frequently due to wear.

One method of producing extruded bodies is to use hot extrusion of thermal-plastic batch in which the viscosity of the batch is lowered by heating the extruder and die assembly. This allows for easier extrusion at lower pressures but requires thermal-plastic binder materials which constitute a large volume fraction of the batch, for example, as much as 30 weight percent. In contrast, the binder in conventional extrusion typically constitutes no more than 10 weight percent of the batch, and more typically can be 2 to 5 weight percent and as low as 1 weight percent of the batch. In both cases the binder or thermal-plastic is typically removed from the green body by heating in the process of forming the final product. Because of the high weight percent of thermal-plastic binder, the cost of thermal-plastic extrusion is higher and any removal of the plastic or binder is more difficult and more expensive.

As the complexity and size (frontal area) of the extrudate increases, it becomes increasingly difficult to maintain uniform extrusion pressure and therefore, flow uniformity of the stiff batches used in commercial processes. The high extrusion pressures which are required tend to exert a large bending stress on the center of the die. As a result, large frontal area dies tend to bow, yielding inconsistent products. Also, as the frontal area increases, the total force required increases, requiring larger and more expensive equipment. At an extrusion pressure of 1000 psi (6,890 KPa), 18,000 pounds (80 KN) of force are required to extrude a 3 inch by 6 inch (7.62 cm×15.24 cm) body, while 288,000 pounds (1,280 KN) are required to extrude a 1 foot by 2 foot (30.5 cm×71 cm) body. A softer batch would reduce the pressure required for extrusion of large frontal area bodies. However, such softer batches also tend to sag during the drying process.

Various methods have been proposed for processing green bodies from raw material slurries. For example, a method has been suggested for processing slender or thin sheets or fibers using very liquid slurries which contain a solvent by contacting the sheet or fiber with a solidifying liquid to dissolve and remove the solvent from the body.

Recently, it has been suggested to contact a porous body formed of a high solids matrix containing thermally gelable organic binder, with a rapid-setting compound for a duration and at a temperature sufficient to stiffen the body, and removing any excess compound from the body, the rapid-setting compound being characterized by (a) having a strong water affinity to pull water out of the matrix, and (b) having appropriate molecular blocking configuration and/or larger stearic hindrance to prevent the water from re-entering the matrix. It has also been suggested to contact such extrudates with electromagnetic radiation within certain frequencies either while the bodies are in the die, or as the extrudates exit the die.

There have been no suggestions to extrude complex shaped articles such as honeycombs from solvent-containing, soft batches by contacting the articles with a drying liquid in which the solvent and optionally, portions of the solid particles are soluble.

SUMMARY OF THE INVENTION

It is the object of the present invention to provide a method of making a self-supporting cellular green body by a) mixing solid particles with a binder and a solvent to form a viscous mixture or soft batch; b) forming the soft batch into a cellular green body; c) bringing the formed green body into contact with a drying or hardening medium comprising a liquid in which the solvent is soluble and the solid particles and the binder are insoluble to form a self-supporting cellular green body; and optionally d) drying the body in air.

In another aspect, the invention relates to a method of making a self-supporting cellular green body using a liquid injection extrusion die in which drying or hardening liquid is injected into the cells of the cellular body as the body is being extruded. The self-supporting cellular body is formed using a soft batch material by passing the batch through an extrusion die which comprises (i) a body plate or top portion and a face plate or bottom portion each having an inlet and an outlet face, and an outlet portion, the outlet face of the body plate being in facing, abutting contact with the inlet face of the bottom portion, the body plate having a plurality of parallel, elongated, primary feed holes each having a longitudinal axis, the primary feed holes extending from the inlet to the outlet face of the body plate, the face plate having a plurality of parallel, secondary feed holes, a plurality of intersecting slot segments defining a plurality of pins having a pair of opposite longer sides, each pin bordered and defined by a plurality of the slot segments, an outlet end of each of the secondary feed holes communicating with the slot segments; (ii) drying liquid reservoir or channel located between the face and body plates; the secondary feed holes extending from the outlet face of the face plate, through each pin, to and communicating with the reservoir or channel.

In yet another aspect, the invention relates to a method of forming a porous structure by mixing at least two solid components with a binder and a solvent to form a viscous mixture of soft batch, forming the batch into a cellular green body, and contacting the formed body with a drying liquid in which the solvent and at least one of the solid components are soluble, and at least one of the solid components and the binder are insoluble.

DETAILED DESCRIPTION OF THE INVENTION

This invention discloses a method of forming extruded cellular green bodies by using a batch which is shaped by extrusion through a die and which maintains essentially its shape before drying using a liquid drying agent. According to the present invention, a viscous mixture or soft extrudable batch material is prepared which contains (1) a powder or solid, or a precursor of the powder or solid, (2) a binder, and (3) a solvent.

Viscous mixtures or soft batches require lower extrusion pressures than stiff batches and greatly reduce die wear and lead to more consistent products and longer die life. As a result of the low extrusion forces required to process such soft batches, it is also possible to use a variety of materials including plastics, carbon, glass, metal, and ceramics to form the die orifice. A softer batch provides easier mixing of the batch components, improves batch homogeneity and leads to better dispersion of the binder.

Soft batches also make it possible to extrude bodies with frontal areas larger than are possible with conventional stiff batches. In certain cases a softer batch will tend to give improved skin quality and reduce the number of surface checks. Surface defects occur in conventional extrudates due to local adhesion between the batch and the die wall, poor flow, or to poor knitting of the batch material. Surface defects, such as checks and fissures, can also occur during drying due to drying stresses. In the present invention, these defects are reduced or eliminated by drying the extrudate in a drying or hardening liquid rather than in air. Soft batches can be extruded into large, complex shapes at lower pressures and then hardened in a buoyant drying liquid.

Useful powder or solid precursors for the invention are plastics such as ion exchange resins and polymer particles, metals, carbon or ceramic powders and their precursors. In addition, the powder may contain one or more constituents which are preferably soluble in the solvent.

The average particle size of the powder may vary, ranging from sub-micron size to greater than 750 microns. The particle size need only be limited by the orifice size, for example, in the case of an extrusion die, the slot dimension which typically ranges from 4 mils (127 microns) to 30 mils (762 microns), the particle sizes may range from sub-micron size to 762 microns.

Examples of useful carbon precursors include sugar, wood fibers and other forms of cellulose such as nut shells and polymeric resins including phenolics. Ion exchange resins such as polystyrene divinyl benzene copolymers are also useful.

Preferred metals include nickel, iron, chrome, aluminum and their alloys.

Useful ceramic powders include zirconia, titania, silica, rare earth metal oxides, alkaline earth metal oxides, first, second and third transition metal oxides, alumina, magnesia, talc, clay, soluble salts such as alkali chlorides or nitrates, silicones, solid or liquid alkoxides and mixtures of these. More preferably, the ceramic powder of the invention may be any standard batch materials, such as clays, talcs, aluminas, zirconia, hafnia, titania, cordierite, magnesia, forsterite, enstatite, (proto)-enstatite, sapphirine, mullite, spinel, carbides, borides, nitrides and mixtures of these. Particularly useful ceramic powders include alpha- and beta-alumina, alumina-chromia solid solutions, chromia, mullite, aluminum mullite-chromium mullite solid solutions, chromium mullite, sialon, nasicon, silicon carbide, silicon nitride, spinels, titanium carbide, titanium nitride, titanium diboride, zircon, zirconium carbide, zirconia/hafnia alloys, clays, talcs, titania, cordierite, magnesia, forsterite, enstatite, (proto)enstatite, sapphirine, mullite, spinel and mixtures of these.

The binder acts to impart the necessary strength to the green body while not dissolving in the drying liquid. Examples of useful binders include poly vinyl butyral, methyl and ethyl cellulose and their derivatives, polyvinyl alcohols, polyvinyl acetates, and poly methacrylates and their derivatives. In some cases, precursors to powders may also act as binders.

The solvent acts to dissolve the binder and make the batch soft. Upon contact with the drying liquid, some or all of the solvent diffuses into the drying/hardening liquid. Examples of useful solvents include alcohols, glycols, ketones, esters, aromatic hydrocarbons, ethers, chlorinated hydrocarbons, water and organic acids.

The batch may also contain one or more additives such as plasticizers, flocculants, dispersants, or gellants. Examples of useful plasticizers include high molecular weight alcohols, glycols, polyethylene and polypropylene glycols, and phthalates such as dibutyl phthalate and butyl phenyl phthalate. Useful dispersants include sodium stearate, fish oil, poly glycols, poly glycol esters, phosphates and phosphate poly ethers.

Several adjustments may be made to improve the green strength of the dried body, to stiffen the batch, or to improve the quality of the extrusion. The batch chemistry may be adjusted so as to give more rapid drying and stronger green bodies. Without intending to be bound by theory, the drying appears to be influenced by the osmotic pressure between the body and the drying liquid, and by the propensity of the binder itself to gel or phase separate. For example, in some cases it may be advantageous to gel or flocculate the batch. The degree of flocculation or gelation required may vary depending on the desired green strength. Examples of flocculants and gelling agents may include simple inorganic and organic acids or bases, such as acetic acid, propionic acid, isobutyric acid, ammonia, ethyl amine, dimethyl amine, diethyl amine and triethyl amine. They may also include more complex or higher molecular weight components such as oleic acid, high concentrations of some dispersing agents, and some binders. Coagulants and binders improve cohesion after ejection from the die and yield more uniform extrudate. We have found that propylene glycol acts much like a coagulant in some of these batches, and that it tends to improve batch cohesion and generally give a more uniform extrudate. Alkoxides and other precursors may act to modify the degree of gelation. Salts may also work in this capacity.

Non-solvents may be added so as to cause partial or total phase separation of the binder. For polyvinyl butyral in ethanol, propylene glycol is a useful non-solvent which modifies the batch rheology. The effect of the propylene glycol is to stiffen the batch and to make it more plastic as stiffer batches tend to hold their shape better when extruded into air. Waxes, oils, and surfactants may also be added to increase the lubricity of the batch.

After mixing, the batch is placed in an extrusion device and the batch is extruded and brought into contact with a drying or hardening medium. Examples of useful drying media include water, alcohols such as methanol, hexane and mixtures of these. For a batch containing poly vinyl butyral in ethanol, a good drying liquid is water. Optionally, the extruded body can be further dried in air or in a controlled atmosphere. Additional heating may also be necessary.

A variety of forming devices can be used to shape the batch for example, an extrusion die. The essence of these devices is to force the batch through an orifice using a pressure gradient. The orifices are shaped to provide the desired extrudate geometry. For example, certain slotted dies may be used to produce a honeycomb extrudate. The body containing the orifice is referred to as the die and may include slot dies, cylindrical tubes, concentric tubes, cellular monoliths (including square, rectangular, round and triangular cells), or other die forms which give thick or thin walled bodies of various shapes and sizes. One such shape is the honeycomb structure which is a very unique one-dimensional channeled structure.

In one embodiment of the invention, the soft batch material containing a solvent, binder and solid particles is formed (e.g., by extrusion) into a cellular structure which is then contacted with a drying liquid in which the solvent is soluble but in which the binder and solid particles are insoluble. If the structure is formed by extrusion, the axis of extrusion may be in any direction ranging from the horizontal to the vertical depending on such process parameters as the rate of extrusion, extrusion pressure, viscosity of the batch, the die size and shape, size and geometry of the extrudate.

With a standard extrusion die, as the extrudate is contacted with the drying liquid for example, by immersion, the drying liquid flows up the narrow channels or cells of the extrudate as it exits the die face. If the rate of extrusion is too rapid, the liquid may not be able to flow up the cells fast enough. At the same time, the drying liquid around the extrudate may exert sufficient pressure on the outside of the extrudate to cause the cells to collapse.

In one particularly useful embodiment, we have found that the soft batch of the invention can be formed into a cellular structure such as a honeycomb by using the modified die design shown in FIGS. 1–8. In addition to the primary batch feed holes, this modified die contains secondary feed holes which allow the drying or hardening liquid to be injected into the cells or channels of the extrudate as it is being extruded. Using such a die, extrudates from soft batches can be contacted with drying liquid either simultaneously with extrusion, or immediately as the extrudate exits the die face. This modified die can provide undiluted drying liquid at the die face and can also maintain the internal pressure necessary to prevent collapsing of the extrudate. The die consists of two plate sections, a top portion 10 and a bottom portion 15 as shown in FIGS. 1a and 1b, each portion containing a front or outlet face 20' and 20 respectively, and a back or inlet face 22 and 22' respectively. When assembled, the outlet face 20' of the top portion 10 abuts the inlet face 22' of the bottom portion to form the die 5 shown in FIG. 1c. The inlet face 22 of the die is located on the side of the die which is directed toward the extrusion ram, while the outlet face is located on the side of the die directed away from the extrusion ram. As batch material is extruded, it enters the feed holes 30 on the inlet face 22 of the top or body portion 10 and exits through the slots 34 in the outlet face 20 of the bottom or face portion 15 of the die 5. Die 5 differs from a standard honeycomb extrusion die by the presence of additional (secondary) feed holes 40, and a channel or reservoir 38 adapted to receive drying or hardening liquid 47 through inlet 36, and discharge the liquid through the secondary feed holes 40. As more clearly shown in FIG. 1c, the secondary feed holes 40 are located within each cell which is defined by die slots or slot segments 33. The reservoir or channel 38 is located in the top portion 10 of the die 5, and the secondary feed holes 40 located in the bottom portion 15, communicate with and connect the channel with the outlet face 20 of the die 5. The secondary feed holes 40 are also parallel to the primary feed holes 30. The drying liquid is injected into the extrudate from the channel or reservoir 38, located between the top and bottom portions of the die 5, through the secondary feed holes 40. The channel 38 is large so as to provide uniform pressure and flow to all of the secondary feed holes 40. The drying liquid is fed to the channel 38 through inlet 36 which may optionally be provided with means such as a control valve for regulating the flow of the drying liquid. The spatial relationship between the various elements of the die are shown in FIGS. 4a, 4b, 5a and 5b.

Even though this aspect of the invention has been illustrated above using a ram extruder, the method can be adapted for other forming devises such as the twin-screw and other types of extruders.

Figure 1A:
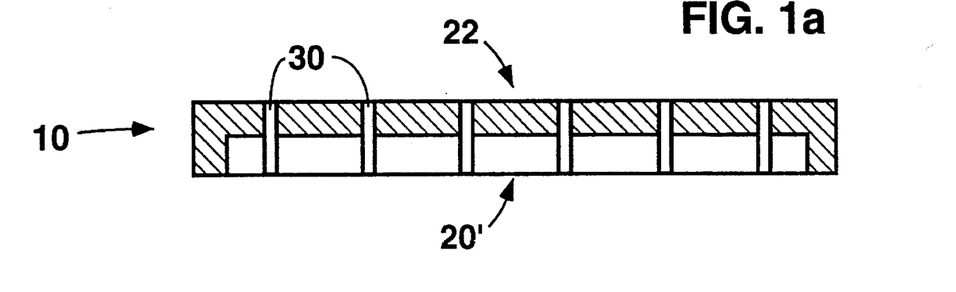
FIG. 1a is a cross-section through the top portion or body face of the die of the invention showing the batch or primary feed holes and the drying liquid channel or reservoir.
Figure 1B:
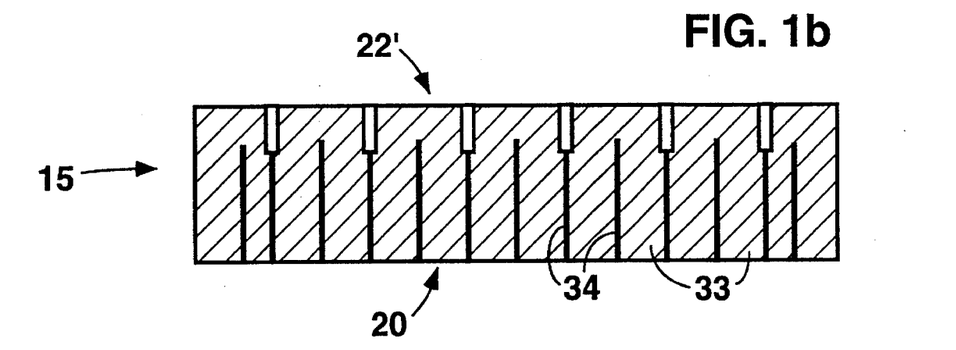
FIG. 1b is a cross-section through the bottom or face portion of the die showing the slots, continuation of the primary feed holes, and the secondary or drying liquid feed holes.
Figure 1C:
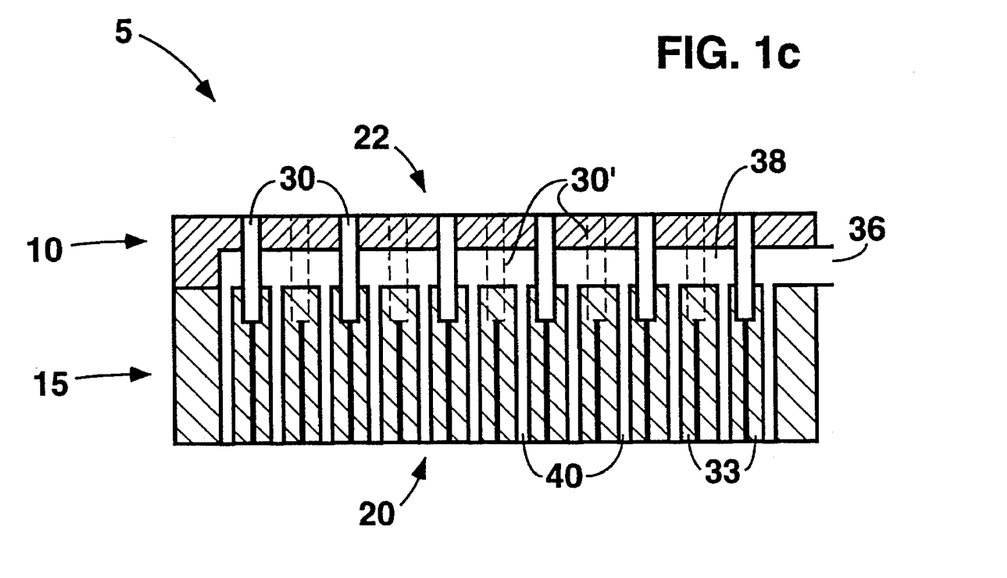
FIG. 1c is a cross-section through the top and bottom portions of the die showing the relative location of the various elements shown separately in FIGS. 1a and 1b above.
Figure 2:
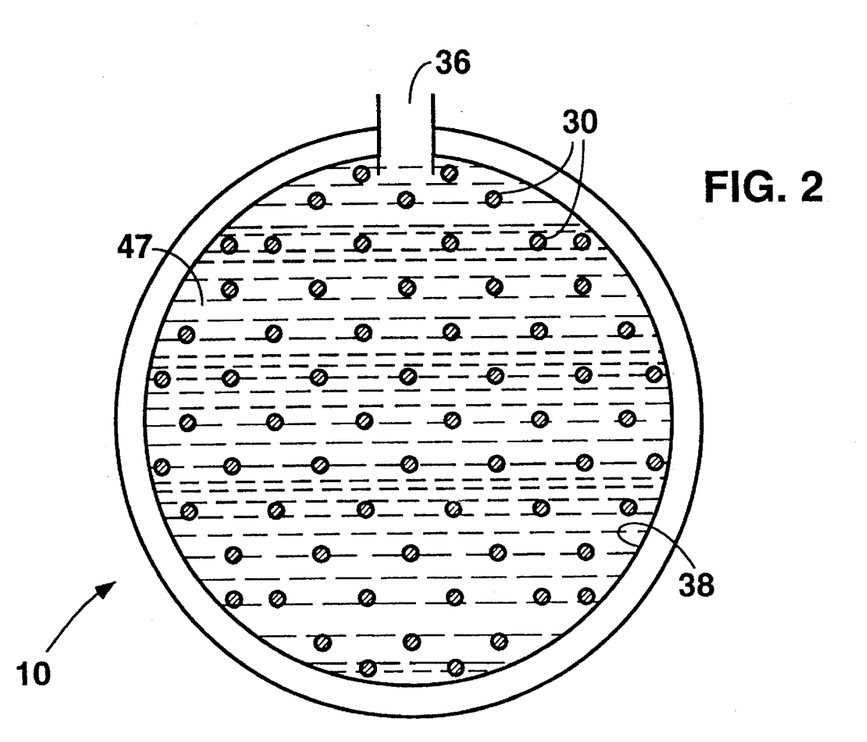
FIG. 2 is a section through the front or outlet face of the top portion of the die showing the primary feed holes relative to the channel or reservoir.
Figure 3:
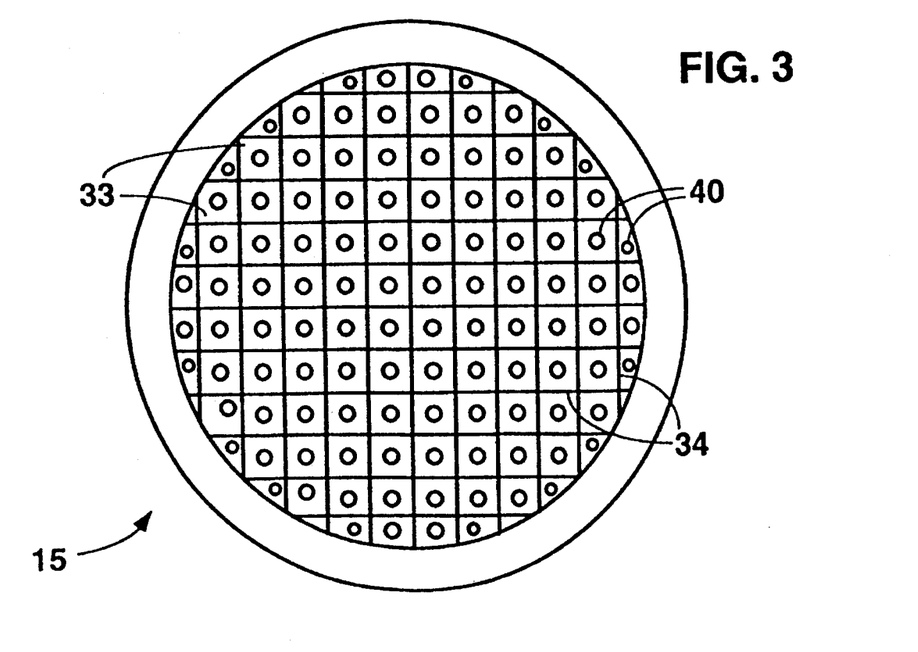
FIG. 3 is a section through the front or outlet face of the bottom portion of the die showing the slots, pins and secondary feed holes.
Figure 4:
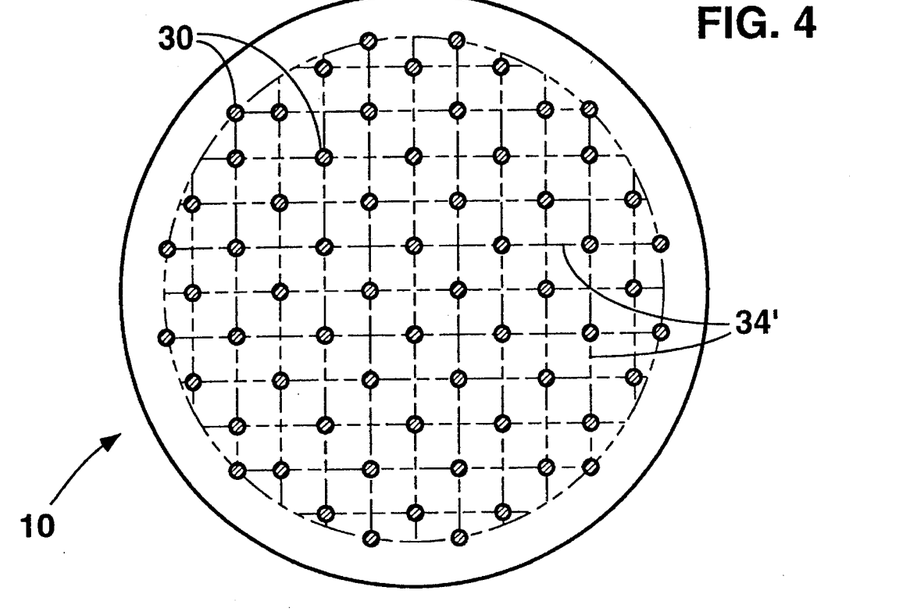
FIG. 4 is a section through the back or inlet face of the top portion of the die showing the primary feed holes and the relative location of the slots 34'.
Figure 5:
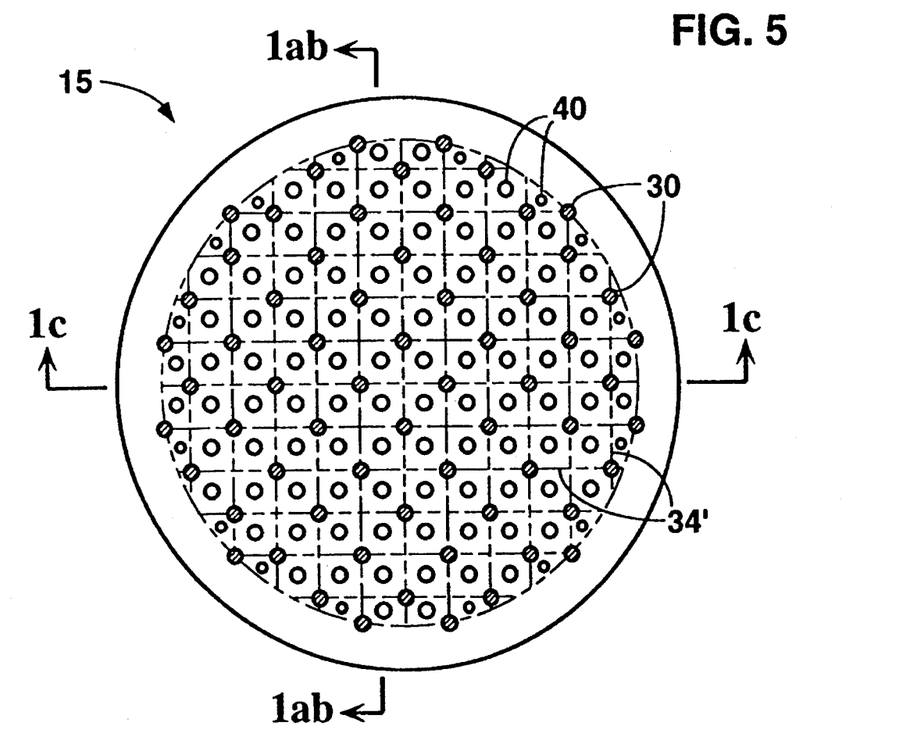
FIG. 5 is a section through the back or inlet face of the bottom portion of the die showing the secondary and primary feed holes and the relative location of the slots 34'.
Figure 6:
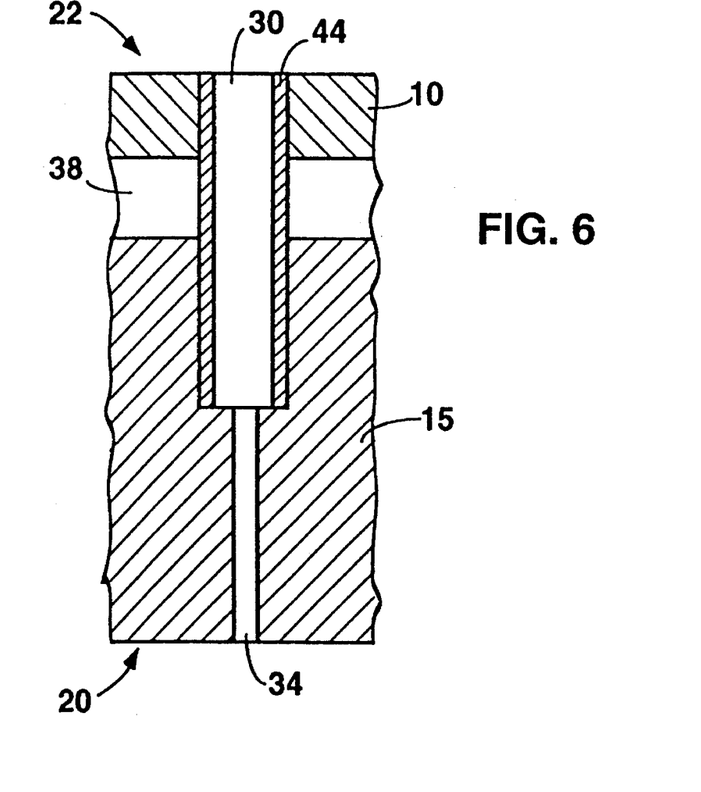
FIG. 6 is an enlarged section of the die showing the use of tube inserts to prevent mixing of the batch and drying liquid within the die.

Referring now to FIG. 6, mixing of the batch material and the drying liquid can be prevented by using tube inserts 44 which substantially surround the primary feed holes 30, and which pass from the back face 22 of the top portion 10 into the bottom portion 15 of the die 5 as shown. The tube inserts 44 may be pressed into both the top and bottom portions of the die or fixedly attached to the inside surface of the primary feed holes.

Figure 7:
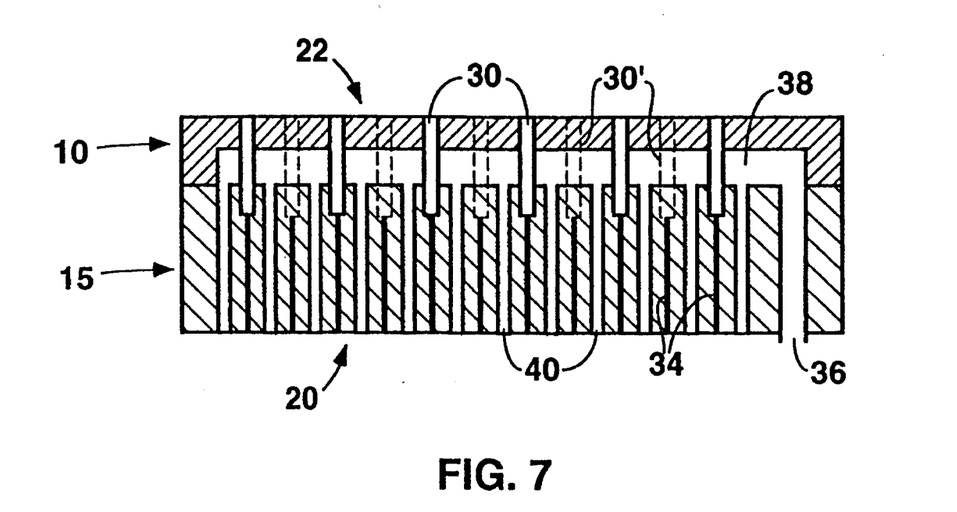
FIG. 7 is a cross-section similar to FIG. 1c showing an alternate position of the drying liquid inlet.

An alternate design of the drying liquid channel 38 and secondary feed holes 40 is shown in FIG. 7. This configuration allows the drying liquid to be introduced from the front face 20 of the die through inlet 36 making it easier to seal between the top and bottom portions of the die.

Figure 8:
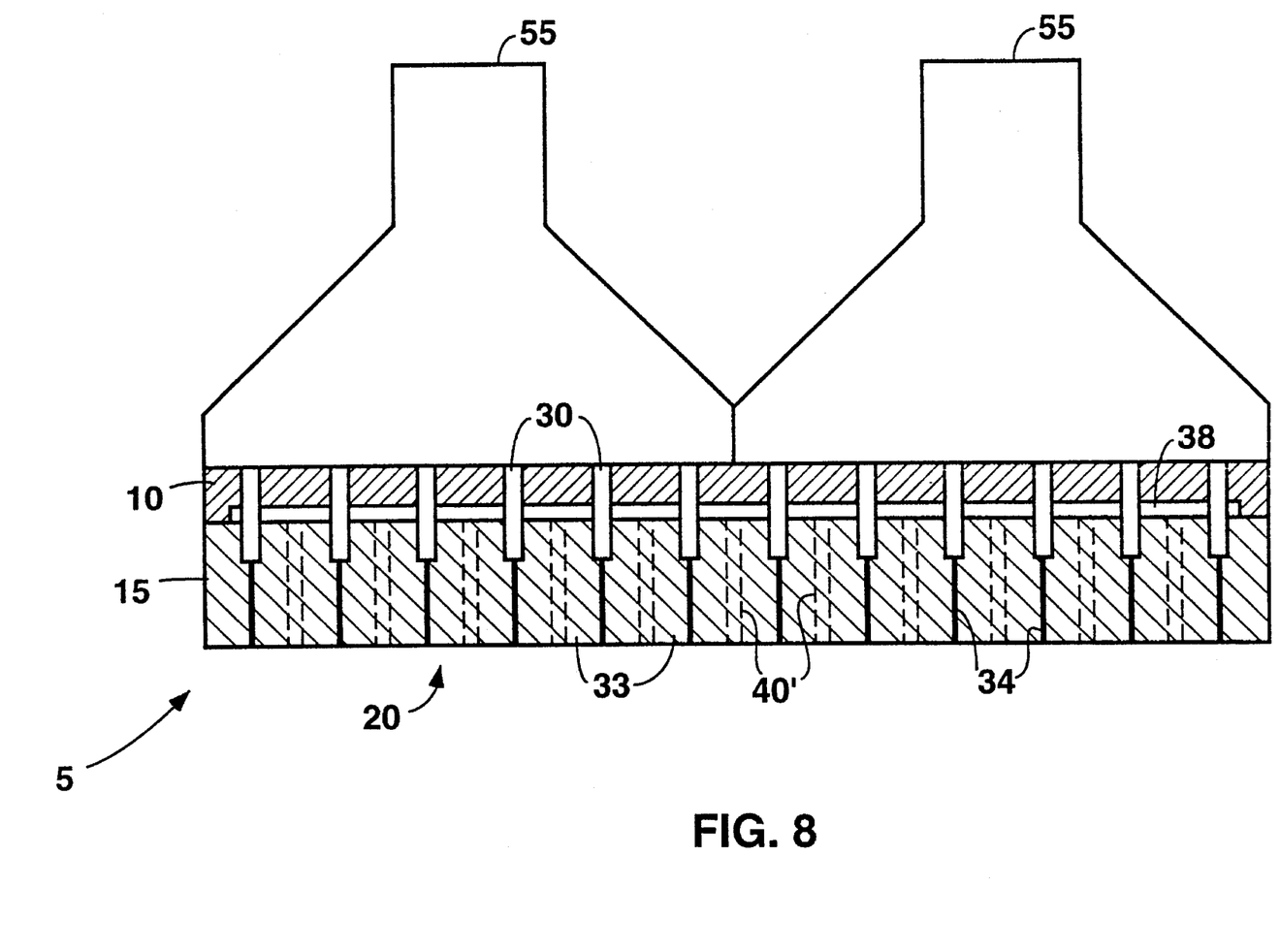
FIG. 8 is a section through a large frontal area die having multiple batch distribution manifolds.

To provide for flow control with large surface area dies, it may be necessary to use large batch distribution manifolds or multiple batch distribution manifolds 55 as shown in FIG. 8.

As contemplated by this invention, and as illustrated in FIG. 8, the material to be extruded passes from the batch distribution manifold 55 of the die through the primary feed holes 30, thence to the associated slots 34 and slot intersections, thence both horizontally and downwardly from each associated slot intersection and exits through the outlet face of the bottom portion to form a green cellular body. As the formed body exits the outlet face 20 of the die 5, drying liquid is injected into and contacted with the green body by passing the drying liquid from the channel 38, through the secondary feed holes 40 and 40', into the cells of the extrudate which are formed by the pins 33.

The drying liquid can be any liquid in which the solvent is soluble but in which the solid particles and the binder are insoluble. If desired, the formed green body can be further dried in air to form a stronger self-supporting cellular green body. For this embodiment, since the extrudate is dried either in the die or immediately as it exits the die face, it is possible to use softer batch materials having viscosities of about 100,000 cps or lower, preferably greater than 20,000 cps.

Typical extrusion dies exhibit variations in slot width and feed hole diameter, which variations tend to favor flow through the wider slots or larger feed holes. This differential flow can cause distortion of the extruded body. Differential flow can also favor missing cells due to plugged feed holes. Die geometry, batch viscosity, extrusion pressure and other process variables can also affect flow. For an extrusion die having 400 cpsi (62 cpscm) and nominal wall thickness of 6 mils (150 microns), at moderate extrusion pressures, (i.e., about 150 psi (1,030 KPa) or greater), differential flow and the related problems can be greatly reduced by using a batch having viscosity of about 100,000 cps or greater. To further reduce or eliminate the problems that can be caused by differential flow, batch stiffness should be chosen so as to reduce batch sensitivity to variations in die geometry. The softer the batch, the more susceptible the formed article will be to the problems associated with differential flow such as bowing.

In a standard extrusion using stiff batches bowing can be controlled using shims, or by slight adjustments to the wet extruded body. However, for articles formed from soft batch materials which are dried or stiffened in a drying liquid, even slight adjustments or deformations will damage the cells or cause hairline cracks in the skin of the body. Such problems can be eliminated or reduced by increasing the batch viscosity to enhance flow uniformity and prevent bowing.

We have found that by applying the present methods to stiff batches, complex shaped objects such as a honeycomb structure can be extruded using standard extrusion dies. By stiff batches we mean batches having viscosity of at least 1,000,000 cps, preferably in the range of $10^6$–$10^8$ cps. Such extrudates accurately reflect the geometry of the die slots and retain their shapes upon exiting the die. In addition to exhibiting uniform flow through a standard die, such stiff batches are also particularly useful for producing cellular bodies with relatively thick wall cross-sections because the high viscosities make the batches more stable during drying.

Generally, the higher the batch viscosity, the less likely it will be to deform the formed body. However, stiff batches require very high extrusion pressure and tend to impart greater wear on the extrusion die.

At very high viscosities, that is, at viscosities greater than about 1,000,000 cps, preferably in the range of $10^7$ to $10^8$ cps, the batch becomes almost if not totally self supporting and easy to handle without deforming the body. For such batches it is possible to remove the formed body from the extrusion die, and then at a later point in time place it in the drying liquid. For such a stiff batch, no special dies are needed since the drying can take place after removal from the die. In such cases, the extrudate can be dried by flowing the drying liquid through the extrudate. For cellular bodies formed with such stiff batches, collapsing of the cells is not as likely because the drying liquid can flow uniformly through the extrudate as it is placed in the drying liquid, or as the drying liquid is poured or sprayed through the cells. While it is not required, for certain batch materials, the buoyancy of the drying liquid may provide an added benefit during drying as it may partially counteract the force of gravity and help to keep the extrudate from sagging under its own weight before it dries and hardens. The preferred batch for standard extrusion dies is any batch material which can be extruded into an article which retains its shape on extrusion into air and which can then be dried in a drying liquid to prevent sagging and promote shape retention over time. We have found that using the method of the invention, well formed cellular bodies having wall thicknesses greater than 1 mil (25 microns) and lengths greater than 0.5 inches (1.27 cm), can be readily produced.

The present invention is also particularly useful for drying batches containing highly porous materials which would otherwise be difficult to dry without cracking. Typically, highly porous batches contain 3 to 5 times the solvent required for non-porous materials because the porous materials tend to soak up most of the solvent which would otherwise be available to plasticize the batch. When such porous batches are extruded, the extrudates are soft, difficult to handle, and easily damaged. Further, tremendous stresses develop when the formed bodies are dried, leading to cracks and fissures. One such material is activated carbon which often requires many hours or even days to dry using controlled humidity dryers. By using the method of the invention, many of the above problems can be eliminated or reduced and the drying time can be reduced from days to hours. After removing enough solvent to prevent subsequent cracking, the dried body may then be placed in a conventional drying oven, dielectric drier, both, or other drying medium for further drying. The present method gives superior drying uniformity and appears to lower the stress related cracks and other problems caused by differential drying.

In another particularly useful embodiment, the method of the invention is used to form highly porous structures by including in the solid particles, solids which are soluble in the drying liquid to create pores in the formed body. This method can also be used to form structures having predetermined pore size distributions. This can be achieved by adding soluble solid particles having the predetermined size distribution so that when the formed body is contacted with the drying liquid, the soluble solids dissolve in the drying liquid leaving behind the desired pore structure. Such methods can be used to form highly porous activated carbon structures.

In addition, the present batch is also useful in forming carbon bodies which are not degraded by water. We have found that with the proper binder, such as polyvinyl butyral, a dried body can be obtained which may be useful for applications such as water filtration and automobile emissions control devises.

Figure 9:
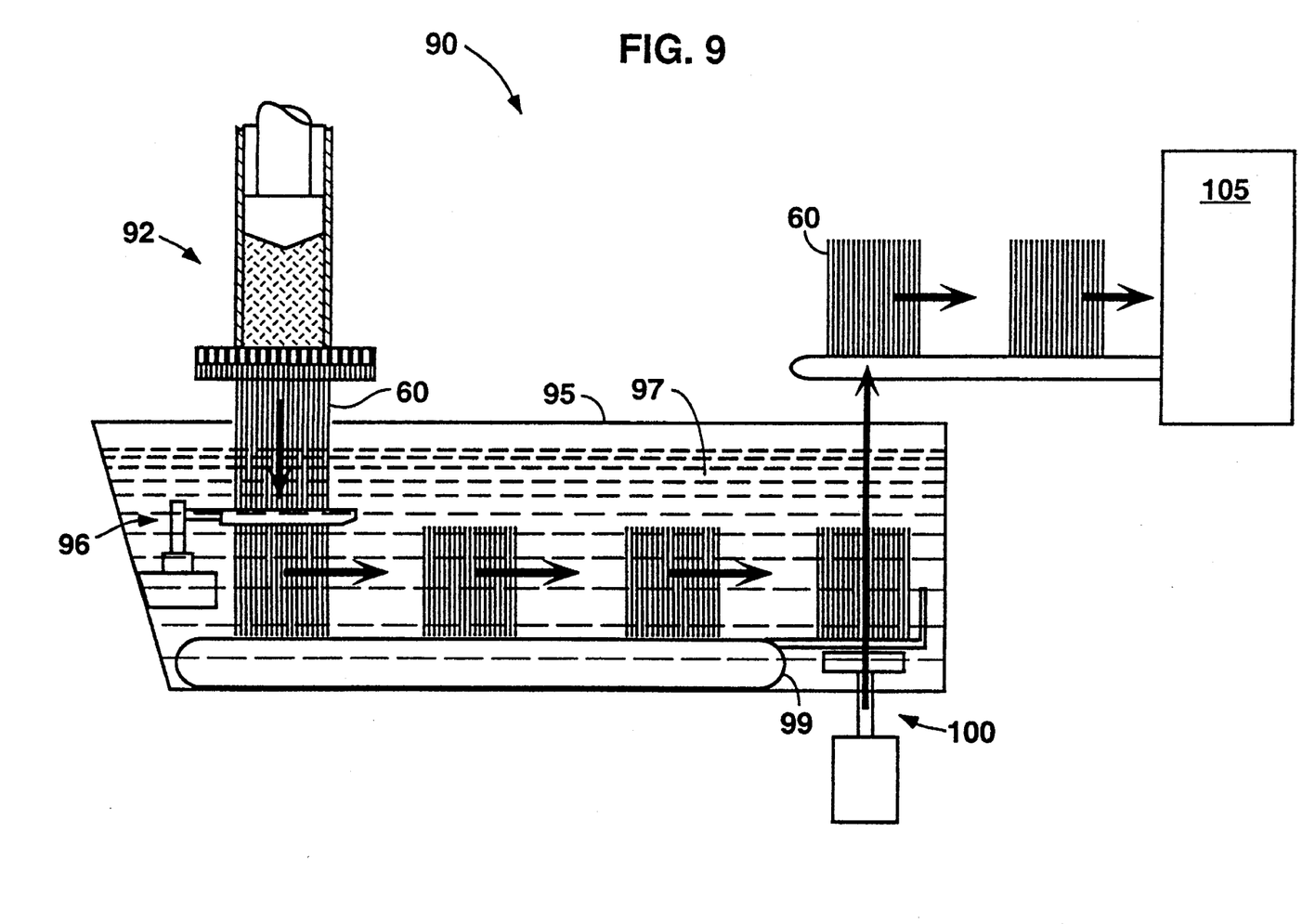
FIG. 9 is a schematic diagram of a drying apparatus or system adapted for the drying method of the invention.

If desired, after drying in the drying liquid, the extruded bodies of the invention may be fired or sintered to produce bodies useful as catalyst supports or substrates, diesel particulate filters, separation membrane supports, activated carbon structures, heat exchangers, regenerator cores or other useful devices. By way of illustration, the method of the invention may be practiced using any system adapted to form a plastically deformable body, contact the formed body with a drying liquid for a time sufficient to dry or harden the body by removing the solvent, and optionally subjecting the dried or hardened body to additional drying or sintering. One such useful drying apparatus 90 is illustrated in FIG. 9 by way of example and not limitation. As the extrudate 60 exits the forming member 92, it is immediately or soon thereafter inserted in a receptor 95 and submerged in the drying liquid 97. The extrudate is then cut into the desired sizes using any appropriate cutting means 96 such as a knife. The duration of the extrudate in the drying liquid 97 will vary depending on the composition of the batch, the viscosity, the size, complexity and shape of the extrudate, the die geometry, the solvent/drying liquid combination and other process variables. For each combination, the optimal duration can be determined by experimentation. After the optimal contact time has been attained, the rigidified, self-supporting extrudate is removed from the receptor 95 by any practical means for example, using a conveyor belt 99 and a lift 100. If desired, the self-supporting body may be further dried in air or conveyed into an oven 105 for additional drying or firing to form a sintered body.

EXAMPLES

The following examples illustrate the method and product of this invention. The batch composition for Examples 1–12 are summarized in Table 1 below.

EXAMPLE 1

Cordierite is a useful ceramic material which is extruded in large quantities. Green bodies were extruded with the following composition which is designed to yield a cordierite body when fired.

(a) Ceramic Powder:

In a 2 liter polyethylene container the following powders were placed:

| Compound | Mass |
| --- | --- |
| Clay | 473.2g |
| Talc | 402.1g |
| Alumina | 134.7g |

The talc used has a mean particle size of around 12 microns with 5% greater than 95 microns. The dry batch materials were mixed for 40 minutes using a Turbula mill (Willy A. Bachoter AG Maschinenfabrik Basel).

(b) Binder/Solvent Mixture:

In a 500 ml polyethylene container the following was added:

| Compound | Component | Mass |
| --- | --- | --- |
| Absolute Ethanol | Solvent | 300 g |
| Polyvinyl Butyral | Binder | 50 g |

(c) Batch Solution:

The binder/ethanol mixture was rolled for about half an hour and added, along with 74 g of ethanol, to the 2 liter container containing the clay, talc and alumina.

The batch was then placed on a roller mill and rolled overnight. To the rolled batch was added 50.7 g of ethanol and 5 g of dibutyl phthalate, a plasticizer. The total volume

TABLE 1

All batches are relative to 1,000 g of ceramic batch.

| Example Number | Liquid Content (g) | | | Total Liquid (g) | Total Liquid (cc) | Polyvinyl Butyral (g) |
| --- | --- | --- | --- | --- | --- | --- |
| | Ethanol | Dibutyl Phthalate | Propylene Glycol | | | |
| 1 | 424.7 | 5 | — | 429.7 | 542.9 | 50 |
| 2 | 365/IPA* | — | — | 365 | 464.7 | 60 |
| 3 | 365 | — | — | 365 | 462.4 | 60 |
| 4 | 321 | 24 | — | 345 | 429.7 | 60 |
| 5 | 180 | — | 205 | 385 | 425.9 | 60 |
| 6 | 316 | 24 | — | 340 | 423.4 | 60 |
| 7 | 219 | — | 140 | 359 | 412.6 | 35† |
| 8 | 315 | 12 | — | 327 | 410.6 | 60 |
| 9 | 286 | 24 | — | 310 | 385.4 | 60 |
| 10 | 232 | 24 | 70 | 326 | 384.5 | 70.9 |
| 11 | 200 | — | 135 | 335 | 383.7 | 60 |
| 12 | 253 | 25 | 15/Water** | 293 | 359.5 | 50 |

*Isopropyl Alcohol
**Water
554 High Molecular Weight Polyvinyl Butyral of liquid was 542.9 cc (see Table 1) and the batch had the consistency of a thick pancake batter. The viscosity was measured using a Brookfield LVTDV-II viscometer, using spindle 25, and found to be 17,700 cps and 26,100 cps at shear rates of 0.066 sec-1 and 1.32 sec-1 respectively.

Approximately half of the batch was poured into a 25 ton (222 KN) Wahlco ram extruder and extruded through a die suitable for extruding bodies having 400 cell per square inch (62 cells per square centimeters (cpscm)) and wall thickness of 5 mil (125 microns), using an extrusion pressure of less than 200 psi (1380 KPa). As the extrudate exited the die face 22, it was immediately contacted with water (the drying liquid). Because of the very low viscosity of this batch, the batch material tended to drip from the die even when no extrusion pressure was applied. As a result, when extruded into air, the extrudate did not have any resemblance of the die geometry. That is, the extrudate did not have any clearly definable cells.

The die end of the extruder (including the die), was submerged in a bucket of water and the batch was extruded through the die and directly into the water. Although the batch was quite soft to begin with, on entering the water it became stiff. The extrusion was periodically interrupted to allow the removal of the green ware after which the extrusion could be restarted easily. When extruded directly into water, portions of the extrudate clearly reflected the cellular geometry of the die and portions of extrudate were obtained which contained as many as 16 adjacent cells in an approximately square array (i.e., an array of 4×4 cells), representing only about 5% of the die face. The thickness of the cell walls, in the dry green body, was measured from an optical micrograph, to be around 4 mils (100 microns).

This soft material was extruded at the slowest possible ram speed. Even at this very slow speed the cells collapsed. The residual pressure remaining after the ram was stopped was sufficient to extrude the material. At faster speeds, all the cells collapsed and no useful extrudate was formed.

EXAMPLE 2

The total volume of liquid in this example was reduced from 542.9 cc of Example 1 to 464.7 cc. In addition, the alcohol used was 365 g of isopropyl alcohol rather than ethanol. Finally, no dibutyl phthalate binder was used (see Table 1).

About 1,000 g of pre-cordierite ceramic powders (i.e, clay, talc and alumina) were dry mixed. To this was added 365 g of isopropanol and 60 g of polyvinyl butyral. This soft batch was roller milled for several hours, and was extruded into water using a ram extruder. Cellular bodies with cell density of 400 cells per square inch (62 cpscm) and 6 mil (150 micron) web thickness were produced using extrusion pressure of 150–200 psi (1030–1380 KPa). These are significantly lower extrusion pressures than the 900– 1100 psi (6200–7600 KPa) normally required for standard pre-cordierite batches using the same die. These cellular bodies hardened readily in water. The extrudate hardened in water to produce a well formed cellular structure which could be easily handled.

EXAMPLE 3

In this case, the total volume of liquid was 462.4 cc, which was nearly the same as Example 2. No dibutyl phthalate binder was used, but the alcohol used was ethanol (see Table 1).

About 1,000 g of pre-cordierite ceramic powders were dry mixed. To this was added 365 g of ethanol and 60 g of polyvinyl butyral. This batch was roller milled for several hours, and was extruded into water using the ram extruder and extruded through a 200 cell per square inch (31 cpscm) die with 15 mil (380 micron) web thickness. The extrusion pressure was less than 100 psi (690 KPa), using the ram extruder. Again these cellular bodies hardened readily in water.

EXAMPLE 4

The total liquid volume was again reduced, to 429.7 cc. In this case, 321 g of ethanol and 24 g of dibutyl phthalate were used (see Table 1).

About 1,000 g of pre-cordierite ceramic powders were dry mixed. To this was added 321 g of ethanol, 24 g of dibutyl phthalate and 60 g of polyvinyl butyral. The batch was roller milled for several hours and was extruded in water using the ram extruder. Since the total liquid volume was less than the preceding examples, the extrusion pressure through a 400 cpsi (62 cpscm) die using a ram speed of 1.5 in arbitrary units was 350 psi (2,410 KPa). This pressure is very low in contrast to standard extrusion batches which would have extrusion pressures close to 900 psi (6,200 KPa) through the same die. These cellular bodies hardened readily in water.

EXAMPLE 5

The total liquid volume was reduced to 425.9 cc. In this case, 180 g of ethanol, and 205 g of propylene glycol were used (see Table 1). No dibutyl phthalate was used.

About 1,000 g of pre-cordierite ceramic powders were dry mixed. To this was added 60 g of polyvinyl butyral, 180 g of ethanol and 205 g of propylene glycol. This moderate viscosity batch was roller milled for several hours, and then extruded in the ram extruder. It was possible to continuously extrude approximately 3 foot (91 cm) length of 400 cell per square inch (62 cpscm) honeycombs into water. The green bodies hardened rapidly in water. The extrusion pressure at a ram speed of 1.5 in arbitrary units was 350–375 psi (2,410–2,590 KPa) through a 400 cpsi (62 cpscm) die. When the extrudates were extruded directly into air they initially reflected the die geometry but soon slumped and lost their shape before they could be dried.

EXAMPLE 6

The total liquid volume of 423.4 cc was similar to Example 5, but in this case 316 g of ethanol and 24 g of dibutyl phthalate were used (see Table 1).

About 1,000 g of pre-cordierite ceramic powders were dry mixed. To this was added 60 g of polyvinyl butyral, 316 g of ethanol, and 24 g of dibutyl phthalate. The batch was roller milled and extruded in the ram extruder. The cells in the extrudate collapsed when extruded into air. When extruded in water, 400 cpsi (62 cpscm) honeycombs were obtained at an extrusion pressure of 350–400 psi (2,410–2,590 KPa) at a ram speed of 1.5 in arbitrary units. These cellular bodies hardened readily in water. This was similar to Example 5, which also had a similar volume of liquid. The extrusion pressure of both batches was much less than for a standard pre-cordierite batch.

EXAMPLE 7

In another example, the weight percent of polyvinyl butyral binder was reduced from a loading of 5% to 6% based on the weight of ceramic powder employed in the previous examples, to only 3.5 weight %. In addition, the polyvinyl butyral used had a molecular weight of between 180,000 and 270,000 in contrast to the molecular weight of between 30,000 and 34,000 used in the other examples. Finally, the total volume of liquid was reduced to 412.6 cc, using 219 g of ethanol and 140 g of propylene glycol (see Table 1).

About 1,000 g of pre-cordierite ceramic powders were dry mixed. To this was added 35 g of high molecular weight polyvinyl butyral, 219 g of ethanol and 140 g of propylene glycol. This batch was roller milled for several hours, and then extruded in the ram extruder. A portion of the batch was extruded directly into air, was wrapped in foil, and dried in an oven at 95° C. The remainder of the batch was extruded into water. Continuous 3 foot (91 cm) lengths could be produced using a 400 cpsi (62 cpscm) die. The extrusion pressure at a ram speed of 1.5 in arbitrary units was 600 psi (4,140 KPa) and at a speed of 2 in arbitrary units was about 1000 psi (6,900 KPa). These pressures were higher than the previous batches due in part to the lower total liquid volume and the presence of propylene glycol and the higher molecular weight binder. The extrudates hardened faster in water than the softer batches described in Examples 1–6 above.

EXAMPLE 8

In this example, the total liquid volume was reduced below Example 7 to only 410.6 cc, using 315 g of ethanol and 12 g of dibutyl phthalate. No propylene glycol was used. The lower molecular weight binder was used (see Table 1).

About 1,000 g of pre-cordierite ceramic powders were dry mixed. To this was added 315 g of ethanol, 12 g of dibutyl phthalate and 60 g of polyvinyl butyral. After roller milling, this batch was extruded into water using a 400 cpsi (62 cpscm) die. Extrusion pressures at speeds of 1.5 and 2 arbitrary units respectively were 250 and 400 psi (1,720 and 2,760 KPa) in contrast to typical extrusion pressures for standard pre-cordierite batch in a 400 cpsi (62 cpscm) die of 900–1100 psi (6,200–7,600 KPa) at a speed of 2 to 2.5 in arbitrary units. This batch was still too soft to extrude directly into air. As with Example 5, when extruded into air, the extrudate slumped and lost its shape before it could dry. Samples extruded into water hardened readily.

EXAMPLE 9

The total volume of liquid in this example was 385.4 cc. 286 g of ethanol were used and 24 g of dibutyl phthalate binder (see Table 1).

About 1,000 g of pre-cordierite ceramic powders were dry mixed. To this was added 286 g of ethanol, 24 g of dibutyl phthalate, and 60 g of polyvinyl butyral. The batch was roller milled for several hours, and was extruded into water using the ram extruder. Cellular bodies with a cell density of 400 cells per square inch (62 cpscm) and 6 mil (150 micron) web thickness were produced. These cellular bodies hardened readily in water. The extrusion pressure was 400 psi (2,760 KPa) at a ram speed of 1.5 in arbitrary units and 250 psi (1,720 KPa) at a speed of 1.25 in arbitrary units. Several 400 cpsi (62 cpscm) cellular bodies were also extruded into air but were very soft.

The batch was also used to extrude cellular bodies with 25 cells per square inch (4 cpscm) and 30 mil (762 micron) web thickness. The cellular bodies were extruded into water and hardened readily. 25 cpsi/30 mil (4 cpscm/0.76 mm) web cellular bodies were also extruded directly into air; these honeycombs were soft but could be handled without causing them to collapse. The formed cellular bodies hardened readily in water and had fewer skin checks than similar samples dried in air.

EXAMPLE 10

In this example, the total liquid content was reduced to 384.5 cc using 232 g of ethanol, 24 g of dibutyl phthalate and 70 g of propylene glycol (see Table 1).

About 1,000 g of pre-cordierite ceramic powders were dry mixed. To this was added 232 g of ethanol, 24 g of dibutyl phthalate, 70 g propylene glycol and 71 g of polyvinyl butyral. After roller milling, this stiffer batch was extruded into water using a 400 cpsi (62 cpscm) die. The extrusion pressures were found to increase to 400 psi (2,760 KPa) at a ram speed of 1.5 in arbitrary units, and 700 psi (4,830 KPa) at a ram speed of 2.5 in arbitrary units. These pressures were still substantially lower than standard pre-cordierite batches which could extrude between 900–1100 psi (6,200–7,600 KPa) at similar ram speeds. When extruded into water, very firm extrudates resulted. When extruded into air, the extrudates were soft and tended to collapse before drying.

EXAMPLE 11

The total liquid volume was kept similar to Example 9 at 383.7 cc, but no dibutyl phthalate was used. 200 g of ethanol and 135 g of propylene glycol were used (see Table 1) to prepare this slightly stiffer batch.

About 1,000 g of pre-cordierite ceramic powders were dry mixed. To this was added 200 g of ethanol, 135 g propylene glycol and 60 g of polyvinyl butyral. After roller milling, this batch was extruded into water using a 400 cpsi (62 cpscm) die. The extrusion pressures were 550–600 psi (3,800–4,140 KPa) at 1.5 arbitrary speed units, and 900 psi (6,200 KPa) at a ram speed of 2 in arbitrary units. Although the pressure at the faster speed was at the lower end of the range typically obtained for standard pre-cordierite batches, the honeycombs extruded directly into air were very weak. Samples extruded into water hardened immediately.

EXAMPLE 12

In this example, the total liquid volume was reduced to 359.5 cc using 253 g of ethanol, 25 g of dibutyl phthalate and 15 g of water added (see Table 1).

About 1,000 g of pre-cordierite ceramic powders were dry mixed. To this was added 253 g of ethanol, 25 g of dibutyl phthalate, 15 g of water and 60 g of polyvinyl butyral. After roller milling, this batch was extruded into water using a 400 cpsi (62 cpscm) die. Extrusion pressures similar to Example 10 were obtained of 350–400 psi (2,400–2,760 KPa) at a ram speed of 1.5 in arbitrary units, and 800 psi (5,520 KPa) at a ram speed of 2.5 in arbitrary units. Although it was possible to obtain a honeycomb product when this batch was extruded only into air, the extrudate did not maintain its structural integrity. When the batch was extruded into water, it was possible to obtain hard well-formed honeycombs.

EXAMPLE 13

In this example, carbon honeycombs were extruded using a batch which could be dried in water. Carbon batches are difficult to dry because of their high surface areas and the usual drying time for extrudates produced from a water based batch of this carbon composition is over 100 hours.

To 400 g of activated carbon powder was added 324 g of propylene glycol and 69.7 g of ethanol. A binder solution was prepared by dissolving 1 part by weight of polyvinyl butyral with three parts of ethanol. In a muller, 282.9 g of the binder solution was added to the wetted carbon powder. The effect of the propylene glycol was to stiffen the batch.

Additional solvents were added to bring the total propylene glycol to 339.6 g and the total ethanol to 311.9 g. Polyvinyl butyral is a particularly useful binder because it can be used in extrusion, and it is not water soluble. As a result, the extruded bodies can be dried in water. It is also FDA approved for contact with food and is virtually non-toxic.

The batch was extruded to form honeycombs with a cell density of 400 cells per inch (62 cpscm) and approximately 6 mil (150 micron) wall thickness. The extrusion pressure was greater than 1000 psi (6,890 KPa). The batch could either be extruded into air and placed in the water after removal from the die or extruded directly into water. After drying in the water for approximately 30 minutes, the extrudate was placed, uncovered, in an oven at 95° C. and ambient moisture. The extrudate was essentially dry when removed from the water and dried completely in less than five hours without cracking.

The dried extrudate had a hydrocarbon adsorption capacity of approximately 43 gm/gm carbon.

EXAMPLE 14

In this example, a batch was prepared with copper, nickel and molybdenum powders. Ni-Cr-Mo and Ni-Cu alloys are used for their corrosion resistance and thermal properties. The batch was prepared consisting of 800 g of nickel, 233 g of molybdenum, and 483.3 g of copper powder. A binder solution was prepared by dissolving 16 g (0.95% by weight of total batch) of high molecular weight polyvinyl butyral in 140 g of ethanol and 10 g of propylene glycol. The metal powders were added to the binder and mixed. Further mixing was performed by extrusion through a spaghetti die.

A range of particle sizes was used to enhance batch plasticity. The molybdenum powder contained particles between 150 mesh (~100 microns) and 325 mesh (44 microns) (Stock no. M-1086, Cerac Inc., Milwaukee Wis.) while 254.3 g of the copper powder was very fine, less than 63 microns (no. CX-1925-2, EM Science, Cherry Hill, N.J.) and the remainder had an average particle size of 10 microns (no. 00094 Alfa, Danvers, Mass.). The resulting batch was a very plastic soft dough.

The batch was used to extrude metal honeycombs with 100 cells per square inch (16 cpscm) and 25 mil (635 micron) walls. Because of the heavy metal powder, the batch was too soft to extrude into air and the cells collapsed. In contrast to low density ceramic batches, metal batches generally require a stiffer batch to produce honeycombs which do not collapse under their own weight after ejection from the die. When extruded into water the batch hardened and honeycombs were obtained with good strength and cells which did not collapse. Unlike clay-talc-alumina batches where the buoyancy of water is noticeable, the metal batch sank to the bottom of the drying liquid. The extrusion pressure was approximately 200 psi (1,380 KPa) at a ram speed of 1.0, and approximately 500 psi (3,450 KPa) at a ram speed of 2 in arbitrary units. Although the batch contained 90.1% powder by weight, these were relatively low pressures and the batch was relatively soft. A stiffer batch, with a higher metal content and less solvent than the present example, would yield improved cell walls and better skin. If these metal honeycombs were heated they would form sintered, metal alloy structures.

In addition to the embodiments discussed above, it will be clear to persons skilled in the art that numerous modifications and changes can be made to the above invention without departing from its intended spirit and scope.

We claim:

1. A method of making a self-supporting cellular green body comprising the steps of:
   a) mixing solid particles with a binder and a solvent to form a batch material;
   b) forming the batch material into a cellular green body by passing the batch material through an extrusion die comprising:
      (i) batch distribution manifold;
      (ii) a body plate or top portion, a face plate or bottom portion, the top and bottom portions each having an inlet and an outlet face, an outlet portion, the inlet face of the body plate being in facing, abutting contact with the batch distribution manifold, the outlet face of the body plate being in facing, abutting contact with the inlet face of the bottom portion, the body plate having a plurality of parallel, elongated, primary feed holes each having a longitudinal axis, the primary feed holes extending from the inlet to the outlet face of the body plate, the face plate having a plurality of parallel, secondary feed holes, a plurality of intersecting slot segments defining a plurality of pins having a pair of opposite longer sides, each pin bordered and defined by a plurality of the slot segments, an outlet end of each of the secondary feed holes communicating with the slot segments; and
      (iii) drying liquid reservoir or channel located between the face and body plates, wherein the secondary feed holes extend from the outlet face of the face plate, through each pin, to and in communication with, the reservoir or channel;

wherein the batch material passes from the batch distribution manifold, through the primary feed holes, thence to the associated slots and slot intersections, thence both horizontally and downwardly from each associated slot intersection and exits through the outlet face of the bottom portion to form a green cellular body; and
   (c) contacting the formed green body with drying liquid in which the solvent is soluble and the solid particles and the binder are insoluble to form the self-supporting cellular green body.

2. The method of claim 1, wherein the extrusion die further comprises tube inserts which surround the primary and secondary feed holes, the inserts extending from the inlet surface of the top portion or body plate into the bottom portion or face plate of the die, and in communication with the slots.

3. The method of claim 1, wherein the formed cellular body is contacted with the drying liquid as the body exits the die by passing the drying liquid from the reservoir, through the secondary feed holes, and into the cells of the cellular body.

4. The method of claim 1, further comprising the step of drying the formed green body in air.

5. The method of claim 1, wherein the batch material has a viscosity in the range of $10^5$ to $10^8$ cps when formed.

6. The method of claim 1, wherein the batch material is passed through the extrusion die at extrusion pressure in the range of 200 to 1100 psi (1380 to 7600 KPa).

* * * * *